(12) United States Patent
Kameyama

(10) Patent No.: US 8,089,348 B2
(45) Date of Patent: Jan. 3, 2012

(54) INFORMATION SERVICE SYSTEM FOR VEHICLE

(75) Inventor: Shogo Kameyama, Chiryu (JP)

(73) Assignee: Denso Corporation, Kariya (JP)

( * ) Notice: Subject to any disclaimer, the term of this patent is extended or adjusted under 35 U.S.C. 154(b) by 445 days.

(21) Appl. No.: 12/476,413

(22) Filed: Jun. 2, 2009

(65) Prior Publication Data

US 2009/0295558 A1  Dec. 3, 2009

(30) Foreign Application Priority Data

Jun. 3, 2008 (JP) ................................ 2008-146124

(51) Int. Cl.
*B60Q 1/00* (2006.01)
*G05D 1/00* (2006.01)

(52) U.S. Cl. .......................................... 340/438; 701/1

(58) Field of Classification Search .......... 340/4.1–4.14, 340/438, 439, 576, 691.1–692; 701/1; 600/484
See application file for complete search history.

(56) References Cited

U.S. PATENT DOCUMENTS

| | | | | |
|---|---|---|---|---|
| 5,813,989 A | * | 9/1998 | Saitoh et al. | 600/484 |
| 5,835,008 A | * | 11/1998 | Colemere, Jr. | 340/439 |
| 5,973,612 A | * | 10/1999 | Deo et al. | 340/7.58 |
| 5,990,795 A | * | 11/1999 | Miller | 340/576 |
| 6,282,464 B1 | * | 8/2001 | Obradovich | 701/1 |
| 6,389,332 B1 | * | 5/2002 | Hess et al. | 701/1 |
| 6,708,078 B1 | * | 3/2004 | Skinger et al. | 700/222 |
| 7,474,957 B2 | | 1/2009 | Matsumoto et al. | |
| 2004/0193068 A1 | * | 9/2004 | Burton et al. | 600/544 |
| 2006/0114123 A1 | * | 6/2006 | Eckstein et al. | 340/903 |
| 2009/0326340 A1 | * | 12/2009 | Wang et al. | 600/301 |

FOREIGN PATENT DOCUMENTS

| | | |
|---|---|---|
| JP | 9-097396 | 4/1997 |
| JP | 09-287974 | 11/1997 |
| JP | 10-104014 | 4/1998 |
| JP | 2000-357300 | 12/2000 |
| JP | 2003-271968 | 9/2003 |
| JP | 2004-030212 | 1/2004 |
| JP | 2005-135018 | 5/2005 |
| JP | 2005-193874 | 7/2005 |
| JP | 2005-231381 | 9/2005 |
| JP | 2005-353033 | 12/2005 |
| JP | 2006-214750 | 8/2006 |
| JP | 2007-047846 | 2/2007 |
| JP | 2007-161056 | 6/2007 |

OTHER PUBLICATIONS

Japanese Office Action dated Apr. 19, 2010, issued in corresponding Japanese Application No. 2008-146124, with English translation.

* cited by examiner

*Primary Examiner* — Benjamin C Lee
*Assistant Examiner* — Sigmund Tang
(74) *Attorney, Agent, or Firm* — Nixon & Vanderhye PC

(57) ABSTRACT

An information service system for a vehicle includes: an information obtaining element for obtaining information, which includes classification information for defining an importance level and an urgency level; a plurality of information output elements having various sensory types so that the information output elements inform the information of an user with various sensory types; a user load detector for detecting a physical and mental load of the user; a selector for selecting one or more information output elements according to the classification information; and a controller for controlling to output the information with the one or more information output elements. The selector selects the one or more information output elements based on the physical and mental load and a priority order of the information.

10 Claims, 8 Drawing Sheets

| IMPORTANCE LEVEL | URGENCY LEVEL | CONTENT |
|---|---|---|
| 1 | 0 | INFORMATION NO. 1 |
| 1 | 1 | INFORMATION NO. 2 |
| 0 | 1 | INFORMATION NO. 3 |
| ⋮ | ⋮ | ⋮ |

FIG. 6

| | INF CLASSIFICATION | | | |
|---|---|---|---|---|
| | A CLASS | B CLASS | C CLASS | D CLASS |
| IMP LEVEL | L | L | H | H |
| URG LEVEL | L | H | L | H |
| TYPE | PREF/ENV COND | EVENT RELATING TO HOBBY | NECESSARY INF | SERIOUS |
| SERVICE TIME | USER REQUEST | TIMELY MANNER AND DETERMINED TO INFORM | USER REQUEST AND TIMELY MANNER | INFORM IMMEDIATELY |
| AMOUNT OF INF | LARGE | SMALL | MEDIUM | SMALL |
| EXAMPLE | PREF AND ENV COND | CONTENTS ADAPTED TO PREF AND COND | TRA CON, BUS INF, OR PRI INF | ABN, BUS INF, OR OBS INF |

US 8,089,348 B2

INFORMATION SERVICE SYSTEM FOR VEHICLE

CROSS REFERENCE TO RELATED APPLICATION

This application is based on Japanese Patent Application No. 2008-146124 filed on Jun. 3, 2008, the disclosure of which is incorporated herein by reference.

FIELD OF THE INVENTION

The present invention relates to an information service system for a vehicle.

BACKGROUND OF THE INVENTION

An information service system for a vehicle such as an automotive vehicle is disclosed in JP-A-2005-231381 and JP-A-2006-214750. The system is a warning device for informing of failure and/or abnormal operation occurred in the vehicle. The warning device turns on a warning light at a position, on which a driver of the vehicle always turns his gaze when he drives the vehicle. For example, the warning light is arranged around a meter, an instrumental panel or a head-up display. Alternatively, the warning device generates a warning sound. Recently, it is wall-known that the vehicle includes a running safety system. For example, the system detects another vehicle or an obstacle around the subject vehicle with using a camera or a radar. When the system detects the obstacle or another vehicle, the system displays an image about proximity to the obstacle or the other vehicle, or generates a warning sound corresponding to the proximity. Further, since a car navigation system and a Telematics system such as a G-Book system (which is a trademark) become common, the information service system guides a route to a destination, provides traffic information, provides to introduce the destination, provides music and/or video, and the like.

The conventional information service system provides information without considering the current situation and information preference of an occupant of the vehicle. Thus, the system generates the warning sound, turns on warning light such as a luminescence indicator, and displays warning image on a display at the same time, Accordingly, a user of the system cannot understand the warning information since a large amount of information that exceeds the limit of user's grasp is presented to the user. As a result, the user has to distinguish the necessary information from the unnecessary information at the time when the system provides the large amount of information. This forces the user to bear the burden. In some cases, the user may not understand the meaning of the information. Thus, even when the system of the vehicle provides information, it is difficult for the user to grasp the information instantaneously.

SUMMARY OF THE INVENTION

In view of the above-described problem, it is an object of the present disclosure to provide an information service system for a vehicle.

According to an aspect of the present disclosure, an information service system for a vehicle includes: an information obtaining element for obtaining information, which includes classification information for defining an importance level and an urgency level; a plurality of information output elements having various sensory types so that the information output elements inform the information of an user with various sensory types; a user load detector for detecting a physical and mental load of the user; a selector for selecting one or more information output elements according to the classification information; and a controller for controlling to output the information with the one or more information output elements. The selector selects the one or more information output elements based on the physical and mental load and a priority order of the information.

In the above system, even when various information having different priority orders are output, the output element is selected according to the importance level and the urgency level of the information. Thus, the information having high importance level and high urgency level is surely recognized by the user.

BRIEF DESCRIPTION OF THE DRAWINGS

The above and other objects, features and advantages of the present invention will become more apparent from the following detailed description made with reference to the accompanying drawings. In the drawings:

FIG. 6 is a diagram showing information classification table;

DETAILED DESCRIPTION OF THE PREFERRED EMBODIMENTS

Figure 1:
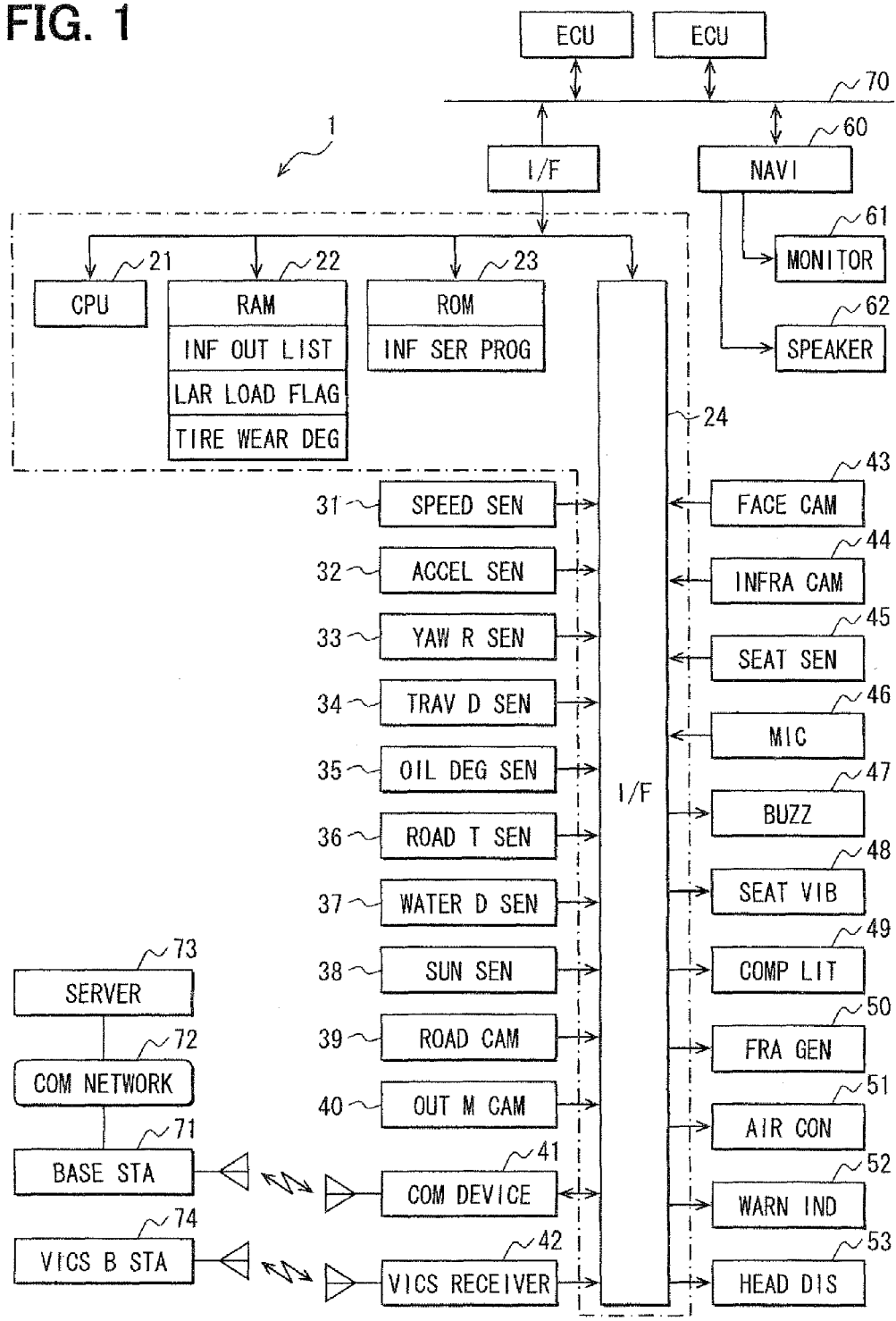
FIG. 1 is a block diagram showing an information service system for a vehicle.

FIG. 1 shows an information service system 1 for a vehicle according to an example embodiment of the present disclosure. The system 1 is mounted on and fixed to the vehicle. The system 1 includes an electric control unit as a microcomputer 2 for controlling the system 1. Alternatively, the system 1 may be provided by multiple microcomputers, which are electrically coupled with each other with a communication means.

The microcomputer 2 includes a CPU 21, a RAM 22, a ROM 23 and an input/output device 24 as an interface, which are coupled with each other by using an internal bus. The RON 23 stores an information service application program for executing a fundamental process of the system 1. The CPU 21 executes the information service application program with the RAM as a working area.

The input/output device 24 is coupled with multiple sensors for detecting a running state of the vehicle. For example, the device 24 is coupled with a speed sensor 31 for detecting running speed of the vehicle, an acceleration sensor 32 for detecting acceleration of the vehicle along with a traveling direction of the vehicle, and a yaw rate sensor 33 for detecting raw rate of the vehicle. Further, the device 24 is coupled with a traveling distance sensor 34 for detecting a traveling distance, and an oil degradation sensor 35 for detecting degradation of engine oil. Furthermore, the device 24 is coupled with other sensors for detecting environmental conditions around the vehicle such as a road surface temperature sensor 36 for detecting temperature of a road on which the vehicle runs, and a water-drop sensor 37 for detecting rain, a sunshine sensor 38 for detecting an amount of sunlight. Further, the device 24 is coupled with a road camera 39 for catching an image of the road surface and an outside monitoring camera 40 for catching an image of an outside of the vehicle to monitoring an outside situation.

Further, the device 24 is coupled with a communication device 41 for obtaining and receiving information via a communication network 72 such as the Internet. The information is provided as information service by an image or a sound. The information is downloaded from a data server 73 via a base station 71 into the communication device 41. The data server 73 is coupled with the communication network 72. The communication device 41 provides inter-vehicle communication and vehicle-road device communication. Further, the device 24 is coupled with a VICS receiver 42 for receiving a FM wave from a VICS base station 74 so that traffic information such as traffic jam information and traffic control information is obtained.

The device 24 is coupled with a face camera 43 for catching an image of a face of a user in a compartment of the vehicle and an infrared light detector 44 for detecting body temperature of the user such as surface temperature of the face of the user. These cameras provide a physical and mental condition detection means for detecting physical and mental condition such as physical and mental stress of the user. The device 24 is coupled with a seat sensor 45 for detecting whether the user sits down a seat of the vehicle and a microphone 46 for inputting voice information from the user.

Figure 3:
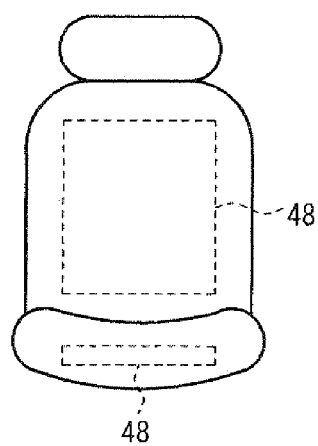
FIG. 3 is a diagram showing an example of arrangement of a seat vibrator.

The device 24 is coupled with various information output elements for outputting information. Specifically, the device 24 is coupled with a buzzer 47 as a warning sound output element, which outputs audio information so that the buzzer 47 provides an audio information output element in a first information outputting section. Further, the device 24 is coupled with a seat vibrator 48 as a haptic information output element. The seat vibrator 48 is embedded in a seating face or a backrest of the seat, as shown in FIG. 3. Alternatively, the vibrator may be mounted on a steering wheel. In this case, the driving vibration corresponding to the road surface may be confused with the vibrator.

The audio information output element is an information transmission means with using sound. The transmission speed of the information in the air is comparatively high. Further, since the audio information output element utilizes the sound, the directionality of the information transmission is comparatively small. Therefore, even if the user does not want to request the information, the information is surely transmitted to the user when the sound reaches an ear of the user. Thus, the information is forcedly transmitted to the user. Here, when the user can shut his eyes to avoid receiving the visual information, so that the recognition of the visual information is controllable. On the other hand, in case of sound having large transmission force, it is difficult for the user to avoid receiving the audio information. Thus, when the audio information is continuously output for a long time, the load of the user may be increased since the sound generates noise. Thus, the continuousness of the information transmission is comparatively small.

The haptic information output element is an information transmission means with using vibration or the like. The transmission speed of the information in the haptic information output element is substantially equal to that of the sound. It is necessary to contact the haptic information output element with a body of the user directly or indirectly. The transmission of the information is quite locally transmitted to the user, compared with other elements. The information transmission concentration is superior to the other elements. When the information is transmitted to another person, a person may wave a hand, which corresponds to the visual communication, or the person may call the other person, which corresponds to the audio communication, if other visual communication or other audio communication exists, it is difficult to transmit the visual communication and the audio communication to the other person. However, when the person taps the other person's shoulder, which corresponds to the haptic communication, the haptic communication is surely transmitted to the other person, Thus, the haptic information output element surely transmits the information to the user. The haptic information output element is arranged at a structure in the compartment of the vehicle, the structure which always contacts the user. The structure is, for example a seat or a steering wheel.

Figure 2:
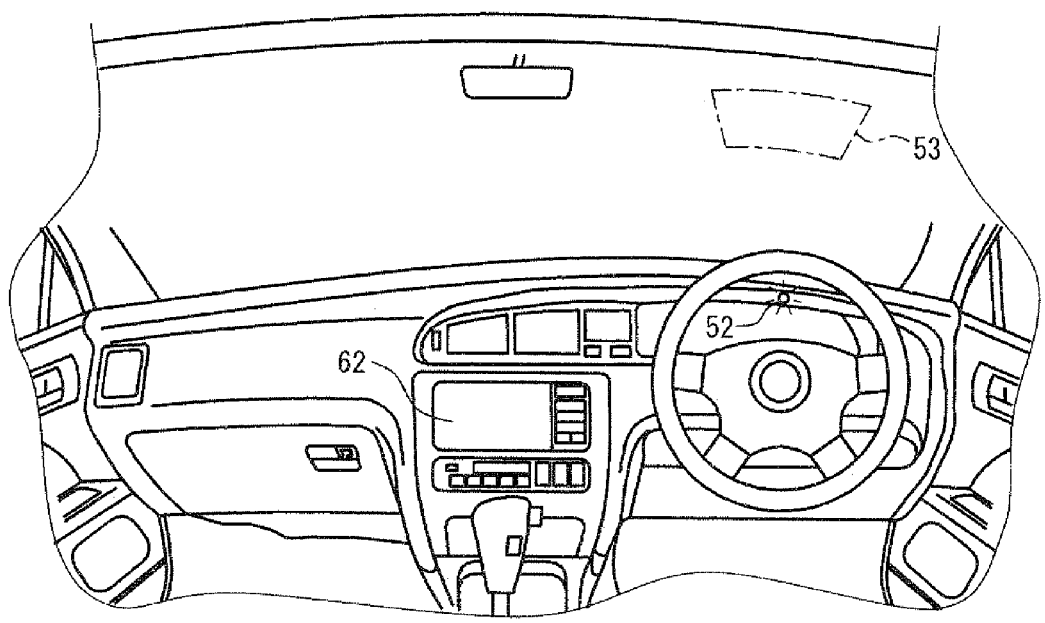
FIG. 2 is a diagram showing an example of arrangement of an information output section in the system.

The device 24 is coupled with a warning indicator 52 as a luminescence indicator, which includes a light emitting diode, and a head-up display 53. The luminescence indicator may be formed of a lamp or a light emitting diode. The warning indicator 52 and the head-up display 53 provide visual information output elements in a second information outputting section. Here, the visual information output element may be formed of a liquid crystal display, an EL display or a plasma display. As shown in FIG. 2, the warning indicator 51 is mounted at a position of an instrument panel in the compartment, and faces a driver seat. The head-up display 53 projects an image regarding visible information on a window shield, which is disposed above the instrument panel. Further, the device 24 is connected to a fragrance generator 50 for generating fragrance or aroma. The fragrance generator 50 provides an olfactory information output element. The fragrance generator 50 is arranged near a seat or an air duct of an air conditioner 51.

Here, the visual information output element is an information transmission means with using light. The transmitting speed of the light in the air is largest, so that the information is transmitted to the user quickly. Further, when the visual information output element continues to turn on or display the information, the information transmission is continuously executed for a long time without bothering the user. However, it is necessary for the information output to position within the user eyesight. Further, even when the information output is disposed within the eyesight, the degree of recognition of the user depends on a position in the eyesight. Thus, the visual information output element has strong directionality. Accordingly, when the information output is without the eyesight, the information is not recognized by the user. Further, when the information output is disposed at a periphery of eyesight of the user, the user may not recognize the information. Thus, the position of the information output in the eyesight affects the recognition degree.

The olfactory information output element is an information transmission means with using fragrance or smell. The amount of information is smaller than that of the visual information output element. Further, the transmission speed of the information in the olfactory information output element is much smaller than that of the visual information output element. By defining a specific fragrance and smell, the user can recognize the special information. Further, even when the olfactory information output element stops to generate the fragrance and smell, a residual component of the fragrance and smell exists in the air of the compartment. Thus, the user can recognize the fragrance and smell for a certain time. Thus, the continuousness of information transmission in the olfactory information output element is comparatively large.

Figures 4, 5:
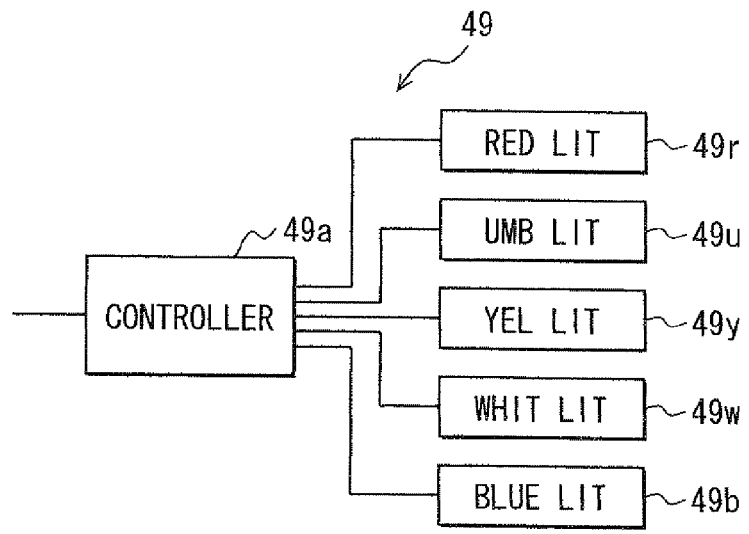
FIG. 4 is a block diagram showing a compartment light in a compartment of a vehicle.
FIG. 5 is a diagram showing an information output list.

The device 24 is coupled with a compartment light 19. FIG. 4 shows the compartment light 49 including multiple lights for emitting various light. In this embodiment, the compartment light 49 includes a red light 49r, an umber light 49u, a yellow light 49y, a white light 49w and a blue light 49b. These lights are controller by a light controller 49a. Specifically, the microcomputer 2 outputs a control instruction signal to select the lights 49r, 49u, 49y, 49w, 49b. Based on the instruction signal, the controller 49a turns on the lights 49r, 49u, 49y, 49w, 49b with a predetermined lighting pattern. Thus, the color of the light 49r, 49u, 49y, 49w, 49b is changeable. Thus, the compartment light 49 provides a visual information output element.

The microcomputer 2 is connected to another ECU via a communication bus 70 in a network manner. The microcomputer 2 transmits information to and receives information from another ECU. For example, a car navigation system 60 includes an information ECU. Based on a map data and a current position of the vehicle detected by the GPS, the current position of the vehicle is shown in the map. The map together with the current position is shown on a screen of a monitor 61. The monitor 61 is arranged in front of a center console, which is arranged next to a driver seat. When the destination is set based on an input of the user, the navigation system 60 displays a route to the destination on the map. Further, the voice navigation is output from the speaker 62. Thus, the route to the destination is guided by the navigation system 60. The monitor 61 provides the visual information output element. Further, the navigation system 60 outputs information about contents of the Internet, which is obtained by the communication device 41. Further, the speaker 62 provides the audio information output element. The speaker 62 may output voice information other than the route guidance.

The microcomputer 2 prepares various information to be served to the user based on detection information from various sensors and information transmitted from another ECU. The information to be informed to the user is, for example, warning information. Further, the information transmitted from another ECU and information obtained from the communication device 41 and/or the VICS receiver 42 are registered in chronological order in the information output list stored in the RAM 22. By executing the information service process program, the microcomputer 2 controls to output the information. As shown in FIG. 5, the information output list includes contents of information to be informed to the user, an importance level of the information and an urgency level. The importance level defines whether the information is important representing a flag "1" or less important representing a flag "0". The urgency level defines whether the information is urgent representing a flag "1" or not urgent representing a flag "0." The importance level and the urgency level provide classification information about the information to be served to the user.

As shown in FIG. 6, the information to be served is classified into four classes according to the classification information. Classes include the A class, the B class, the C class and the D class.

The information in the A class is not important and not urgent. The importance level is low L, and the urgency level is low L. The information relates to hobby or preference of the user and information about environmental condition such as air control by the air conditioner 51. The information in the A class includes information about contents in the Internet obtained from the communication device 41. For example, the information in the A class includes word-of-mouth information adapted to an occupant preference, Further, the information in the A class includes information about a physical condition of the occupant such as facial expression and body temperature of the occupant, which are determined by the image of the face camera 43 and the detection result of the body temperature sensor 44. The information in the A class is served at a time when the user requests the information. The amount of information is large.

The information in the B class is not important but urgent. The importance level is low L, and the urgency level is high H. The information relates to interest or preference of the user. Specifically, the information has high topicality and/or is timely information among the contents of the Internet. For example, the information is up-to-date information or rare information. Further, information about an event near the current position of the vehicle that is obtained from the Internet and determined by the car navigation system 60. The event relates to the hobby or preference of the user. The information in the B class is served in a timely manner or at a time when the information service system 1 determines it is preferable to inform the information to the user under a predetermined condition. The amount of information is small. The information includes contents adapted to the user preference and an environmental condition.

The information in the C class is important but not urgent. The importance level is high H, and the urgency level is low L. The information is necessary to inform the user. For example, the information relates to vehicle condition information. Specifically, the information is time degradation information for a vehicle condition, which is changed comparatively slow. For example, the information is tire wear information and oil degradation information. The tire wear information includes a tire wear degree, which is determined by the traveling distance information since the tire is replaced to new one. In this case, when the tire is replaced to the new one, the traveling distance is reset to zero. The oil degradation information is determined by detection result of the oil degradation sensor 35. Further, the information in the C class includes information about a position of another vehicle traveling with the subject vehicle and a break for a driver that is obtained by an inter-vehicle communication system, and traffic warning information obtained by the VICS and the car navigation system. Here, the traffic warning information shows a high traffic accident area, a point at which a vehicle runs fast so that the vehicle speed easily exceeds a speed limit, a point at which a person may jump into a road, and a place at which a vehicle runs with unique behavior. The microcomputer 2 may include information data base for an individual person so that the information in the C class includes diplomatic information and information about things to bring. When the user utilizes the diplomatic information, the user can promote client interest at the destination of a business trip. When the user utilizes the information about things to bring, the user can check the thing left behind before departure and/or at a arrival time. Further, the information may include family information such as family anniversary. The family anniversary is, for example, a birthday, an enrolment ceremony, a travel day, an advance preparation day and a wedding day. If the user forgets the family anniversary, he might be blamed by his family or his belonging society. The information in the C class is served in a timely manner or at a time when the user requests the information. The amount of information is medium. The information includes a vehicle traveling condition, business information and private information.

The information in the D class is important and urgent. The importance level is high H, and the urgency level is high H. The information may relate to a serious problem. The information relates to abnormal vehicle condition information, which requires handling the abnormal condition immediately. For example, the information is information about approach to a tire wear limit, information about approach to a yaw limit or a roll limit or the like. The information about approach to a yaw limit or a roll limit is determined based on the detection result of the yaw rate sensor 33. Further, the information is information about approach to another vehicle, a pedestrian, an animal, an obstacle or the like, which is determined based on data from the outside monitor camera 40, the inter-vehicle communication system and/or the vehicle-road device communication system. The information is, for example, information about existence of suspicious behavior vehicle, or information about a road surface condition such as a flooded road, a frozen road and a snow covered road, which are determined by the road camera 39 and the road surface temperature sensor 36. The microcomputer 2 may include information data base for an individual person so that the information in the C class includes information about business issue that is necessary to solve before the vehicle arrives at the destination, financial information such as stock, future trade, and currency exchange, or the like. Furthermore, the information is, for example, information about goods available near the current position of the vehicle, the goods being requested from family or prepared for a family memorial day. The goods are, for example, special product, chic product or the like, and the information is obtained from the Internet contents. The information in the D class is served at a time when the information service system 1 determines it is necessary to inform the information to the user with top priority. The amount of information is small. The information includes an abnormal vehicle traveling condition, business information, obstacle information and private information.

Figure 7:
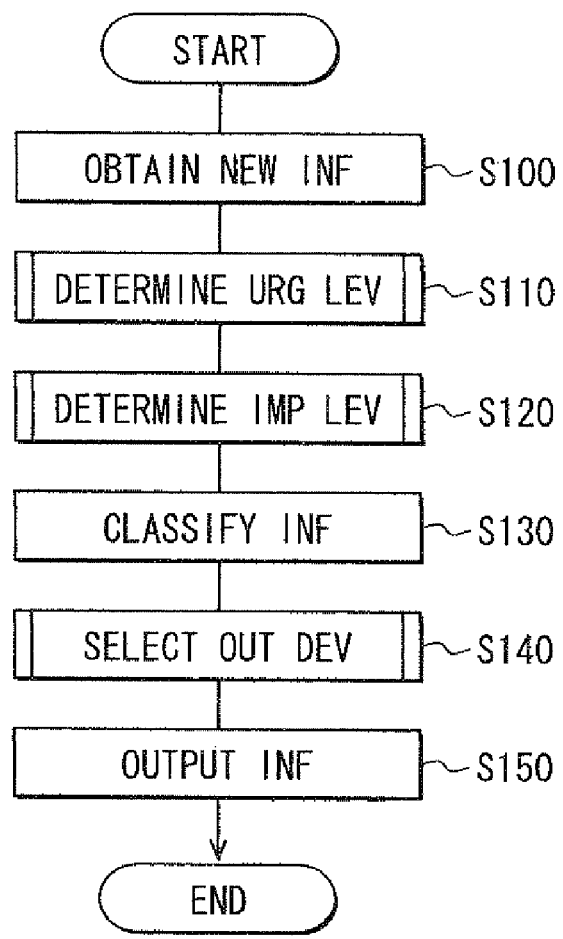
FIG. 7 is a flowchart showing an information output control process.

FIG. 7 is a flowchart showing a main routine of the information output control process, which is executed according to the information service program. When certain information is newly obtained in Step S100, the urgent level is determined in Step S110, and the importance level is determined in Step S120. In Step S130, the information together with the determination results is registered as classified information in the information output list shown in FIG. 5. In Step S140, the output device for outputting the information to be served to the user is determined according to the information classification. The output device is registered in the information output list. Thus, the output device as the information service device is selected in Step S140. In Step S150, based on the determination result of the output device, the information is output.

Figure 8:
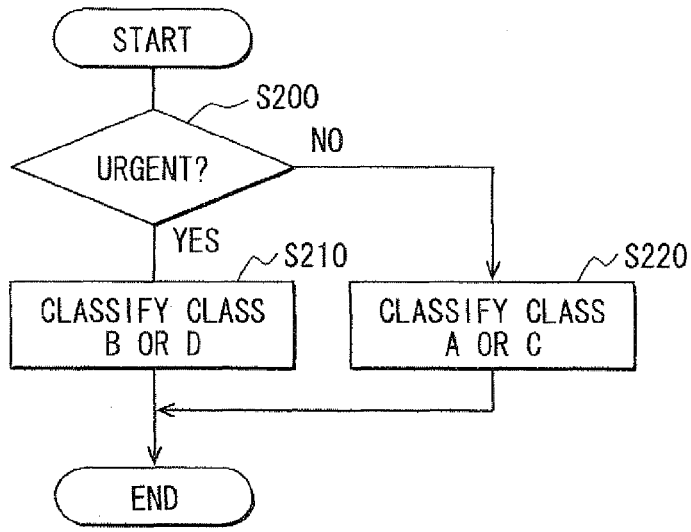
FIG. 8 is a flowchart showing an urgency level determination process.
Figure 9:
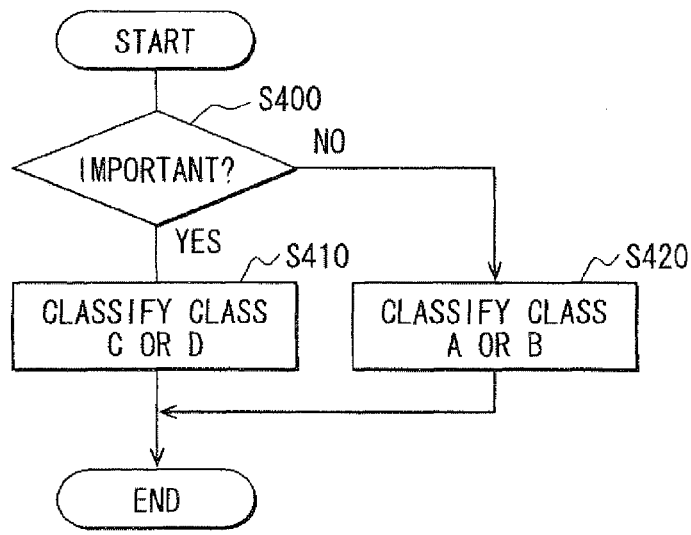
FIG. 9 is a flowchart showing an importance level determination process.

FIG. 8 shows an urgency level determination process. When the urgency level is determined as "urgent" in Step S200, the information is classified to class B or D in Step S210. When the urgency level is determined as "not-urgent" in Step S200, the information is classified to class A or C. FIG. 9 shows an importance level determination process. When the importance level is determined as "important" in Step S400, the information is classified to class C or D in Step S410. When the importance level is determined as, "not-important" in Step S400, the information is classified to class A or B. By executing both determination processes, the information is uniquely classified to one of classes A to D.

Figure 10:
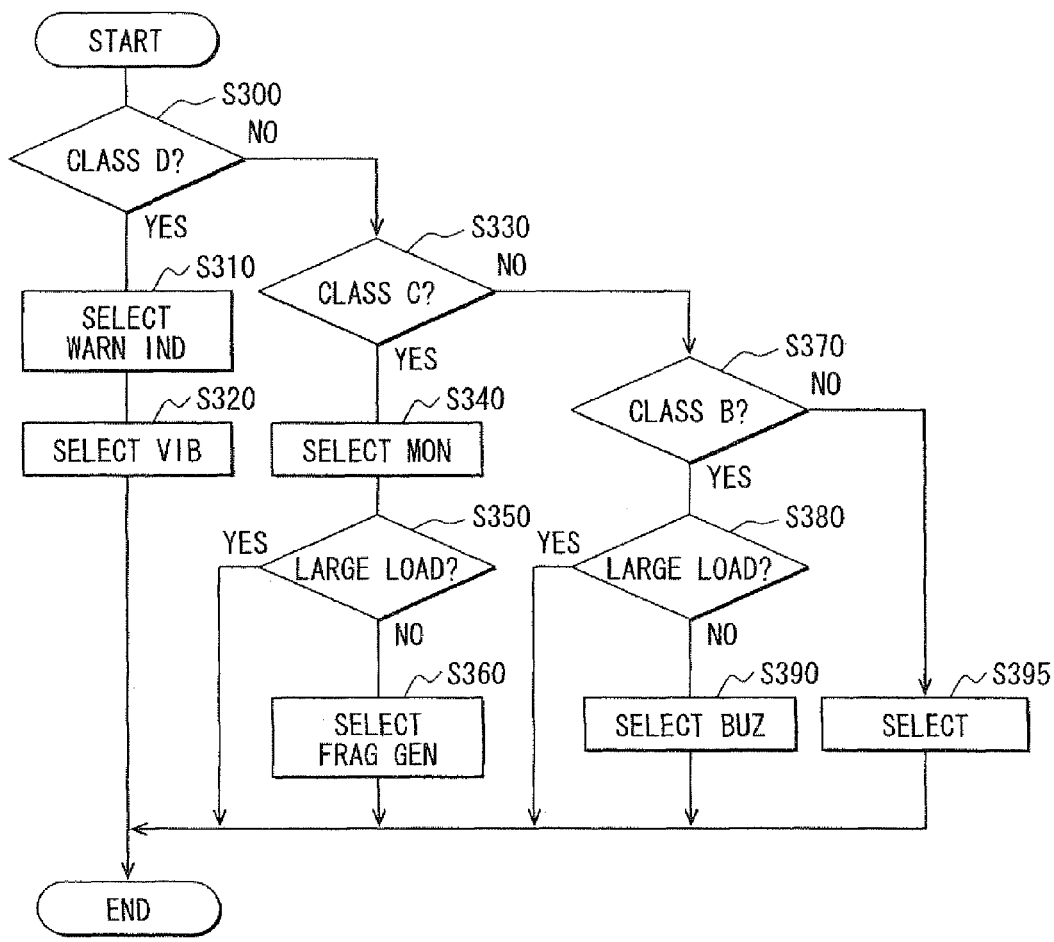
FIG. 10 is a flowchart showing a selection process of an information output device.

FIG. 10 shows an output device determination process for the information to be served. When the class of the information is class D in Step S300, it proceeds to Step S310. In Step S310, the warning indicator 52 in FIG. 1 as the visual information output element is operated to turn on. Further, in Step S320, the seat vibrator 48 as the haptic information output element is operated to vibrate. Thus, both of the visual information and the haptic information are output, so that the information service system 1 informs the important and urgent information of the user surely. Thus, the user surely recognizes the information. For example, in case of the information about occurrence of abnormality, the system 1 may include multiple warning indicators, each of which corresponds to a type of abnormality, and the corresponding warning indicator turns on. Alternatively, the warning display may be displayed on the head-up display 53. Alternatively, the detailed information about the occurrence of abnormality may be auxiliary output on the monitor 61. In this case, the detailed information may be output on the monitor 61 automatically. Alternatively, the detailed information may be output when the user requests to display the detailed information. Here, the user may input the request with physical operation or oral operation.

When it is determined that the information to be served is not the class D, it proceeds to Step S330. When it is determined that the information is the class C in Step S330, it proceeds to Step S340. In Step S340, the monitor 651 as the visual information output element is selected. In Step S350, the physical and mental condition of the user is detected.

Figure 11:
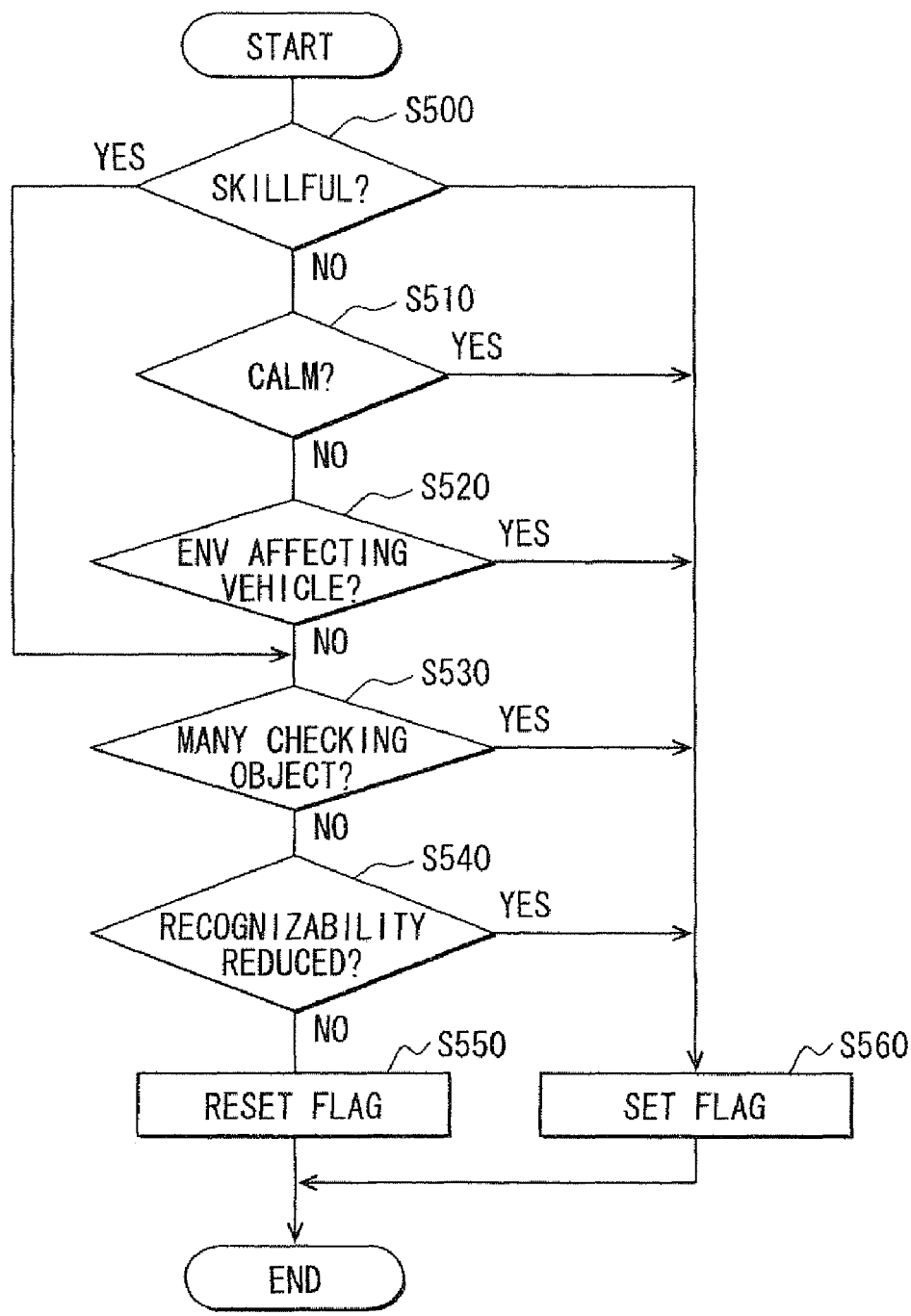
FIG. 11 is a flowchart showing a load determination process.

The load of the user is determined according to the flowchart shown in FIG. 11. In Steps S500 to S540, it is determined whether the user drives the vehicle with high driving skill, whether the user keeps calm, whether an environmental condition affecting the vehicle condition exists, whether the number of objects that user should recognize or check is large, or whether an environmental condition preventing the user recognition exists. In each step, the determination criteria of "YES" is described as follows.

In Step S500, it is determined whether the user drives the vehicle skillful. When the current area of the vehicle is well known for the user, it is determined to "YES." For example, based on the traveling record information stored in the navigation system 60, it is determined whether a total traveling distance in the current area is equal to or larger than a threshold value such as 1000 km. When it is determined to "YES," the user drives the vehicle skilful. Thus, in Step S500, it is determined to "YES."

In Step S510, it is determined whether the user keeps calm, i.e., the user does not lose his temper When the mental condition and/or the physical condition of the user is normal, it is determined to "YES." For example, based on the face image of the user detected by the face camera 43 and the body temperature of the user, it is determined.

In Step S520, it is determined whether the environmental condition affecting the vehicle driving condition exists. For example, when the vehicle speed is equal to or larger than a threshold value, when the vehicle frequently rolls under a certain driving condition, when the road is frozen, covered with snow, or covered with water, when it is required for the driver to have high driving skill, when the vehicle may go into skid, it is determined that the environmental condition affects the driving condition. Here, the speed threshold is calculated to add a predetermined margin to the legal speed limit. The margin corresponds to an individual skill of the user, and is set to, for example, 20 km/h. It is required for the driver to have high driving skill when the vehicle runs on a winding road in a mountain path, for example. This information is determined by the navigation system 60. The information about skid is obtained by the road surface temperature sensor 36, the whether report obtained from the Internet, and/or the inter-vehicle communication information from a probe vehicle.

In Step S530, it is determined whether the number of objects that user should recognize or check is large. When the traffic is heavy, or when a large number of other vehicles run around the vehicle, or a large number of obstacles exist around the vehicle, it is determined to "YES." The traffic information is obtained by the information from the Internet and the VICS. The information about the other vehicles and the obstacles is obtained by the outside monitor camera 40, the inter-vehicle communication system, the vehicle-road device communication system or the like.

In Step S540, it is determined whether environmental condition preventing the user recognition exists, i.e., whether recognizability of the user is reduced. When a water-drop is adhered to the window shield of the vehicle, when the amount of sun shine is smaller than a predetermined threshold value, when snow accumulates on the road so that it is difficult for the driver to recognize an boundary on the road, when the vehicle runs in a blind corner so that the driver view is very limited, it is determined to "YES." Here, the water-drop is detected by the water-drop sensor 37. The sun shine is detected by the sun shine sensor 38. The snow on the road is detected by the road surface sensor 36 and the road camera 39. The driver view is detected by the outside monitor camera 40.

When at least one of the determination results in Steps S510 to S540 other than Step S500 is "YES," it proceeds to Step S560. In Step S560, the flag for representing the large load is set. Unless, it proceeds to Step S550. In Step S550, the flag for representing the large load is reset. In Step S500, when it is determined that the user has high skill, Steps S510 and S520 are skipped. This is because the judgment performance of the user is high, and the user can handle the environmental condition affecting the vehicle driving condition.

In FIG. 10, when it is determined in Step S350 that the load of the user is not large, it proceeds to Step S360. In Step S360, the fragrance generator 50 as the olfactory information output element is selected. Here, the detailed information about the load may be auxiliary output via the monitor 61. When it is determined that the load of the user is large, Step S360 is skipped and the process ends.

In Step S330, when it is determined that the information does not belong to class C, it proceeds to Step S370. In Step S370, it is determined whether the information belongs to class B. When the information belongs to class B, it proceeds to Step S380. In Step S380, the physical and mental condition of the user is determined. When the load of the user is not large, it proceeds to Step S390. In Step S390, the buzzer 47 as the audio information output element is selected. Here, the detailed information about the load may be auxiliary output via the monitor 61. When it is determined that the load of the user is large, Step S390 is skipped and the process ends.

In Step S370, when the information does not belong to class B, it is determined that the information belongs to class D, and it proceeds to Step S395. In Step S395, the monitor 61 as the visual information output element is selected.

The above disclosure has the following aspect.

According to an aspect of the present disclosure, an information service system for a vehicle includes: an information obtaining element for obtaining information, which includes classification information for defining an importance level and an urgency level; a plurality of information output elements having various sensory types so that the information output elements inform the information of an user with various sensory types; a user load detector for detecting a physical and mental load of the user; a selector for selecting one or more information output elements according to the classification information; and a controller for controlling to output the information with the one or more information output elements. The selector selects the one or more information output elements based on the physical and mental load and a priority order of the information.

In the above system, even when various information having different priority orders are output, the output element is selected according to the importance level and the urgency level of the information. Thus, the information having high importance level and high urgency level is surely recognized by the user.

Alternatively, the information output elements may include a first type information output element and a second type information output element. The first type information output element includes at least one of an audio information output element and a haptic information output element. The second type information output element includes at least one of a visual information output element and an olfactory information output element. The audio information output element outputs the information to be recognized by the user with auditory sense. The haptic information output element output element outputs the information to be recognized by the user with haptic sense. The visual information output element outputs the information to be recognized by the user with visual sense. The olfactory information output element output element outputs the information to be recognized by the user with olfactory sense. The selector selects the first type information output element when the urgency level of the information is high, and the selector selects the second type information output element when the urgency level of the information is low.

The haptic information output element and the audio information output element providing the first type information output element have excellent information transmission force, so that it is preferable to transmit the information to the user when the urgency level of the information is high.

Further, the selector may prohibit operating the audio information output element or the olfactory information output element when the physical and mental load of the user is equal to or larger than a predetermined threshold value. It is difficult for the user to avoid receiving the haptic information and the audio information. The haptic information and the audio information may affect the load of the user. Thus, the above feature reduces the user load.

Alternatively, the information output elements may include a visual information output element and a non-visual information output element. The non-visual information output element includes at least one of a haptic information output element, an audio information output element and an olfactory information output element. The audio information output element outputs the information to be recognized by the user with auditory sense. The haptic information output element output element outputs the information to be recognized by the user with haptic sense. The visual information output element outputs the information to be recognized by the user with visual sense. The olfactory information output element output element outputs the information to be recognized by the user with olfactory sense. The selector selects both of the visual information output element and the non-visual information output element when the importance level is high. The selector selects only one of the visual information output element and the non-visual information output element when the importance level is low. When the important information is transmitted to the user, it is preferably to use the visual information, which has excellent continuousness of information transmission. When the visual information is only used for information transmission, the visible information may not be transmitted to the user unless the user cannot see the visual information. Further, it is difficult to emphasize the important information when other visual information exists. Thus, in the above case, both of the visual information output element and the non-visual information output element output the information so that the important information is emphasized effectively. Thus, the important information is surely transmitted to the user.

Further, the selector may select the visual information output element and two of the haptic information output element, the audio information output element and the olfactory information output element when the importance level is high and the urgency level of the information is high. Furthermore, the selector may select both of the visual information output element and the haptic information output element when the importance level is high and the urgency level of the information is high. The selector selects both of the visual information output element and the olfactory information output element when the importance level is high and the urgency level of the information is low. Further, the visual information output element may include an image display and a luminescent indicator. The selector selects the image display as the visual information output element when the importance level is high and the urgency level of the information is low, and the selector selects the luminescent indicator as the visual information output element when the importance level is high and the urgency level of the information is high.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An information service system for a vehicle comprising:
   an information-to-be-provided obtaining device for obtaining information-to-be-provided, which preliminarily includes classification information for defining an importance level and an urgency level of the information;
   a plurality of information-to-be-provided output elements, which inform a user of the information with various sensory types; an information-to-be-provided output element selecting device for properly selecting one type of or a combination of the information-to-be-provided output elements as an output source of the obtained information-to-be-provided according to contents of the classification information;
   an information output controlling device for controlling the selected information-to-be-provided output elements to output the information to be provided; and
   a physical and mental load detection device for detecting a physical and mental load of the user,
   wherein the information output elements include:
      a first type information output element having at least one of an audio information output element for outputting the information to be provided with auditory sense to the user and a haptic information output element for outputting the information to be provided with haptic sense to the user;
      a second type information output element having at least one of a visual information output element for outputting the information to be provided with visual sense to the user and an olfactory information output element for outputting the information to be provided with olfactory sense to the user,
   wherein the information-to-be-provided output element selecting device selects the first type information output element as the output source of the information to be provided when the classification information indicates urgency,
   wherein the information-to-be-provided output element selecting device selects the second type information output element as the output source of the information to be provided when the information-to-be-provided is not an urgency indication object, and
   wherein the information-to-be-provided output element selecting device prohibits to operate the audio information output element or the olfactory information output element when the physical and mental load detection device detects the physical and mental load equal to or larger than a predetermined threshold level.

2. The information service system for the vehicle according to claim 1,
   wherein the haptic information output element includes a vibration generator.

3. The information service system for the vehicle according to claim 2,
   wherein the vibration generator is embedded in a seat of the vehicle.

4. The information service system for the vehicle according to claim 3,
   wherein the olfactory information output element includes a fragrance generator.

5. The information service system for the vehicle according to claim 1,
   wherein the information-to-be-provided output elements further include a visual information output element for outputting the information to be provided with visual sense to the user and a non-visual information output element, which includes at least one of an audio information output element for outputting the information to be provided with auditory sense to the user, a haptic information output element for outputting the information to be provided with haptic sense to the use and an olfactory information output element for outputting the information to be provided with olfactory sense to the user,
   wherein the information-to-be-provided output element selecting device selects both of the visual information output element and the non-visual information output element as the output source of the information to be provided when the classification information indicates important, and
   wherein the information-to-be-provided output element selecting device selects only one of the visual information output element and the non-visual information output element as the output source of the information to be provided when the classification information indicates unimportant.

6. The information service system for the vehicle according to claim 5,
   wherein the information-to-be-provided output element selecting device adjusts selection of two or more non-visual information output elements as the output source of the information-to-be-provided, which is indicated as important by the classification information, according to information whether the information-to-be-provided is indicated as urgent.

7. The information service system for the vehicle according to claim 6,
wherein the information-to-be-provided output element selecting device selects both of the visual information output element and the haptic information output element as the output source of the information-to-be-provided, which is indicated as important by the classification information, when the information-to-be-provided is indicated as urgent, and
wherein the information-to-be-provided output element selecting device selects both of the visual information output element and the olfactory information output element as the output source of the information-to-be-provided, which is indicated as important by the classification information, when the information-to-be-provided is indicated as non-urgent.

8. The information service system for the vehicle according to claim 7,
wherein an image display is selected as the visual information output element when the information-to-be-provided is indicated as non-urgent, and
wherein a luminescent indicator is selected as the visual information output element when the information-to-be-provided is indicated as urgent.

9. The information service system for the vehicle according to claim 5,
wherein the information-to-be-provided output element selecting device selects the non-visual information output element as the output source of the information-to-be-provided, which is indicated as unimportant by the classification information, when the information-to-be-provided is indicated as urgent, and
wherein the information-to-be-provided output element selecting device selects the visual information output element as the output source of the information-to-be-provided, which is indicated as unimportant by the classification information, when the information-to-be-provided is indicated as non-urgent.

10. The information service system for the vehicle according to claim 9,
wherein the information-to-be-provided output element selecting device selects the audio information output element as the output source of the information-to-be-provided, which is indicated as unimportant by the classification information, when the information-to-be-provided is indicated as urgent.

* * * * *